United States Patent [19]
Ackles

[11] Patent Number: 6,024,145
[45] Date of Patent: Feb. 15, 2000

[54] ARTICULATED BOOM AND HEAD FOR MANIPULATING OBJECTS UNDER WATER

[76] Inventor: Gary Ackles, Box 1952, Vernon, Canada, V1T 8Z7

[21] Appl. No.: 09/288,755

[22] Filed: Apr. 8, 1999

Related U.S. Application Data

[60] Provisional application No. 60/081,022, Apr. 8, 1998.
[51] Int. Cl.[7] .............................. A01G 23/00; B27B 1/00
[52] U.S. Cl. ................................. 144/382; 56/8; 83/928; 144/4.1; 144/34.1; 144/34.5; 144/356; 144/336; 210/170; 210/241; 210/242.1
[58] Field of Search ...................... 56/8; 30/228; 47/1.4; 83/694, 928, 743, 830; 144/4.1, 34.1, 34.5, 335, 336, 356, 357, 382; 210/159, 170, 241, 242.1

[56] References Cited

U.S. PATENT DOCUMENTS

| | | | |
|---|---|---|---|
| 3,667,515 | 6/1972 | Corey | 144/34.5 |
| 3,693,676 | 9/1972 | Burch | 83/830 |
| 4,168,729 | 9/1979 | Tausiq et al. | 144/34.5 |
| 4,802,517 | 2/1989 | Laster | 144/34.5 |
| 5,655,584 | 8/1997 | Glawson | 144/34.1 |

Primary Examiner—W. Donald Bray
Attorney, Agent, or Firm—Reidlaw, L.L.C.; John S. Reid

[57] ABSTRACT

The articulated boom and utility head for manipulating objects underwater of the present invention includes an articulated arm mounted at a first end thereof to a free floating platform, and a remotely operable utility head mountable at a second end of the arm. At least one sensor for relaying sensed information from the sensor to a remote operator or processor is mounted to the articulated arm. The sensed information is transmitted in real time as the arm remotely operated under water.

48 Claims, 15 Drawing Sheets

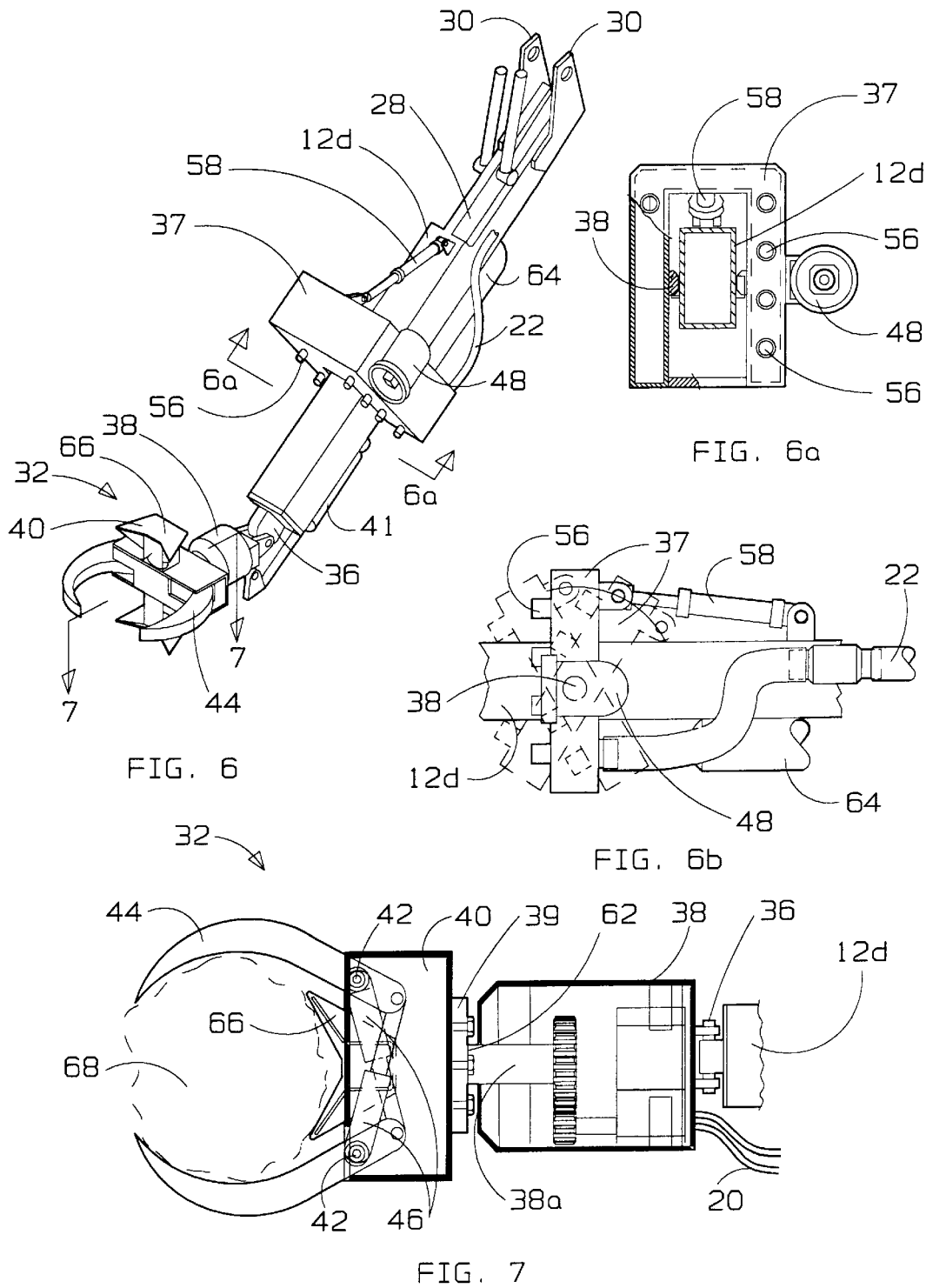

ARTICULATED BOOM AND HEAD FOR
MANIPULATING OBJECTS UNDER WATER

CROSS REFERENCE TO RELATED APPLICATION

This application claims priority from United States Provisional Patent Application No. 60/081,022 filed Apr. 8, 1998 titled Articulated Boom and Head for Manipulating Objects Under Water.

FIELD OF THE INVENTION

This invention relates to the field of devices for manipulating objects under water and in particular to booms for extending underwater from the water surface where the underwater end of the boom has a manipulating device mounted thereto, such as a means for gripping objects, for manipulating objects by selectively actuable articulation of the boom and manipulating device.

BACKGROUND OF THE INVENTION

Flooding of forested valleys by reason of natural causes or by reason of hydroelectric damming has left submerged forest as unharvested free standing trees. A substantial percentage of the submerged free standing trees are within depths of approximately 100 feet of water and so are available to be harvested given an appropriate log cutting and retrieval mechanism.

As opposed to well understood dry land logging practices, the harvesting of submerged free standing trees presents many obstacles. Such obstacles include the fact that if manual divers are used to dive to the base of such trees, to either cut through the tree trunks using saws or other means such as blasting to uproot or free the tree, the diver is faced with severe restrictions on the amount of time that may be spent at such depths. Further, the difficulty of wielding saws or the like in an underwater environment can prove dangerous to the diver. Because a majority of the submerged free standing trees are waterlogged, they will not rise to the surface of their own accord once uprooted or otherwise freed from the bottom and so must be retrieved by means of cables, flotation bags or the like. The result is a slow process which does not yield many logs harvested in a typical day. In the case of some of the larger submerged free standing trees, they are so large, because they form part of very old stands of timber, that unassisted manual sawing is very difficult and retrieval slow and difficult.

A further obstacle relates to underwater visibility. It is known in the prior art to attempt underwater cutting or sawing of submerged elongate objects such as logs or pilings, but what is not addressed is the fact that activity at or near the mudline results in stirring up of silt or the like which quickly makes seeing underwater difficult if not impossible. Such difficulties are in addition to the normal darkness one would anticipate at depth. However, the solution to the problem is not merely the use of underwater lighting. By way of analogy, the problem is akin to the use of driving headlights when set on high beam in a snowstorm. The result is merely a whiteout. Thus, because it is desired to saw or cut submerged free standing trees near their base so as to maximize the recovery of the timber, a means must be provided for clearing, or seeing through, the murky water if is it desired to use a remotely actuated mechanical device employing a real time imaging system for positioning the gripping and sawing or cutting means.

In the prior art, applicant is aware of U.S. Pat. No. 3,667,515 which issued Jun. 6, 1972 to Corey for a Pile Cutting Device. Corey teaches a pile cutting device for use in locations remote from the operator. A pile cutter suspended on a cable is lowered by means of a crane to a desired depth, for example, to the bottom of a water body. The base of the pile cutting device is lowered so as to journal the pile in the base as base is lowered. The base has a guide across which is swept a selectively actual blade. The blade shears the pile at its base.

Applicant is also aware of U.S. Pat. No. 3,693,676 which issued on Sep. 26, 1972 to Burch for an Underwater Pile Cutting Saw. Burch discloses a power saw capable of being manually manipulated above the surface of a body of water for cutting off pilings and the like adjacent to the bottom. A locator member engages around the piling or object to the cut and includes a post about which a saw swings, so as to swing across the locater member to cut off the piling or object. The locator member and saw may be manipulated from a boat, barge, dock or the like, it being an object of the Burch device to eliminate pilings and other objects adjacent the bottom as navigational hazards.

Applicant is further aware of U.S. Pat. No. 4,168,729 which issued Sep. 25, 1979 to Tausig et at for an Underwater Self-gripping Pile Cutting Device. As in the Corey device, Tausig et al teach a shearing pile cutter lowerable by means of a cable onto a pile. The shear cutter assembly has self-gripping teeth or spikes incorporated as part of the cutting blades to hold the pile and prevent slipping during cutting operations. As the hydraulically operated scissor-type cutter blades close about the pile, the spikes bite into the timber and keep the blades from squeezing off the pile.

SUMMARY OF THE INVENTION

An articulated underwater arm comprises a longitudinally extending array of pivotally linked elongate boom sections, adjacent boom sections in the array pivotally linked at longitudinally opposed ends and selectively actuable so as to rotate the adjacent boom sections relative to each other in a plane containing the array, the array extending between a base mountable to a floating platform at a base end of the array, and a head mounting end of the array at a head end of the array. One such head may have a gripping means for gripping submerged elongate objects, or other manipulating attachments thereon, mounted to the array at the head end of the array and selectively actuably rotatable at least in the plane relative to the array and, in one aspect, universally articulatable relative to the array. Clear-water purging means are mountable on the head or on the array proximate the head end. A vision means is mounted on the head or the head end of the array so as to be rotatable with the manipulating attachments, such as the gripping means in the plane. The vision means communicates visual information to a display on the floating platform. The clear water purging means urges clear water, drawn from a remote clear water location, through apertures cooperating with means for communicating the clear water from the remote clear water location to the apertures. Pressurizing means pressurizes the clear water so as to urge the clear water through the apertures into a working zone adjacent the manipulating attachments or within a field of view of the vision means, wherein the field of view includes a working area longitudinally forward of the manipulating attachments, the head, and the array.

In a further aspect of the invention pressure or position sensing means are mounted at joints between adjacent boom sections and communicate rotational position information, by communicating means, to a processor where the water pressure or position information is processed into a graphical display of the array relative to the floating platform, displayable to an operator, whereby the operator may view the display of the visual information and the graphical display of the array and selectively actuate the array, the head, and the manipulating attachments on the head to manipulate an underwater object.

In summary, in one aspect, the articulated boom and utility head for manipulating objects underwater of the present invention includes an articulated arm mounted at a first end thereof to a free floating platform, and a remotely operable utility head mountable at a second end of the arm. At least one sensor for relaying sensed information from the sensor to a remote operator or processor is mounted to the articulated arm. The sensed information is transmitted in real time as the arm is remotely operated under water.

In a second aspect, the present invention includes a means for stabilizing the second end of the articulated arm so that the utility head, when mounted to the second end, maintains a substantially fixed position relative to an underwater object, independent of movement of the first end of the arm.

In one embodiment, at least one sensor includes both a position sensor to provide boom position information and an imaging sensor to provide environmental information from the underwater environment. The imaging sensor may be a visual sensor such as a camera mounted on the arm in a preferred embodiment, although it may be mounted on the head, in proximity to the second end of the arm. The visual sensor is aligned to provide the remote operator with a field of view in front of the utility head. The location of the imaging sensor, whether a visual sensor or otherwise, is not intended to be limiting so long as the field of view may be imaged. Advantageously, a means for dispersing suspended detritus is provided for use when the detritus would, if not dispersed, occlude the field of view. The means for dispersing detritus may be mounted to the arm in proximity to the second end, or may be mounted to the utility head. Because it is desirable to use interchangeable utility heads, a preferred embodiment provides for mounting the means for dispersing detritus on the arm so as not to interfere with the operation or interchangeability of the heads. Such a design choice is not intended to be limiting.

Further sensors mounted on the arm may include rotary transducers mounted at articulated joints between the boom segments. The rotary transducers sense relative rotational movement of the boom segments about the joints between the segments, and provide a corresponding signal for transmission to a remote location for processing by a computer and for display as corresponding arm position information at a graphical interface for use by the operator.

In a preferred embodiment, the means for dispersing detritus comprises a clear water manifold. The manifold is supplied with clear water, under pressure, by a water conduit from a water source remote from the second end, for example, from the water surface. A plurality of nozzles mounted on the manifold are aligned to direct the clear water into the field of view of the imaging sensor. Advantageously, the clear water manifold is pivotally mounted to the boom. A manifold actuator is mounted between the manifold and the boom for selective pivoting of the manifold according to remote control inputs by the operator.

In a further aspect of the present invention, the boom is a longitudinally extending array of elongate, pivotally linked, rigid boom segments. The boom segments are pivotally linked at their ends by articulated elbow joints. Boom segment actuators cooperate between adjacent boom segments to selectively fold and unfold, i.e. retract or extend, the array of boom segments. The boom segment actuators are in a preferred embodiment hydraulic rams remotely actuable by the operator.

The boom segments are rotated relative to one another by actuation of the hydraulic rams. The hydraulic rams are actuated by means of a primary hydraulic circuit. Advantageously, the means for stabilizing the second end includes a hydraulic float circuit cooperating with the primary hydraulic circuit.

The interchangeable utility heads may include, without intending to be limiting, the following types of heads: selectively operable claws; a selectively operable clam shell rake; a selectively operable overpack; a selectively operable suction dredge; a selectively articulatable viewing arm; a selectively operable core sampling head; an extraction head; a selectively operable vibrator head; a selectively operable grout application head; and, a selectively operable surface cleaning head.

The boom segment actuators are alternatively referred to herein as first actuators mounted between the adjacent boom segments for selective relative rotation of the adjacent boom segments relative to each other. Second actuators are provided, which cooperate with the second end of the boom and the utility bead when mounted thereon, for selective actuation, that is, rotation or extension of the utility head relative to the second end of the boom. The first and second actuators are of course remotely actuable by control inputs from the operator. In the preferred embodiment, the water manifold is a rigid container pivotally mounted to the boom. A third actuator is mounted between the rigid container and the boom for selective pivoting of the at least one water nozzle so as to direct a stream of water from the nozzle into the field of view of the visual sensor.

Advantageously, the boom is maintained in a neutral buoyancy state by hollow, air filled tanks mounted near the second end of the boom.

BRIEF DESCRIPTION OF THE DRAWINGS

FIG. 6 is an enlarged isometric view of the gripping head, clear water manifold and remote vision system of the present invention.

FIG. 6a is a sectional view along line 6a—6a in FIG. 6 showing the clear water manifold partially cut away.

FIG. 6b is a side elevational view of the flush water manifold of FIG. 6 illustrating the scope of rotation.

FIG. 7 is a sectional view along line 7—7 in FIG. 6.

DETAILED DESCRIPTION OF PREFERRED EMBODIMENTS

Figure 8:
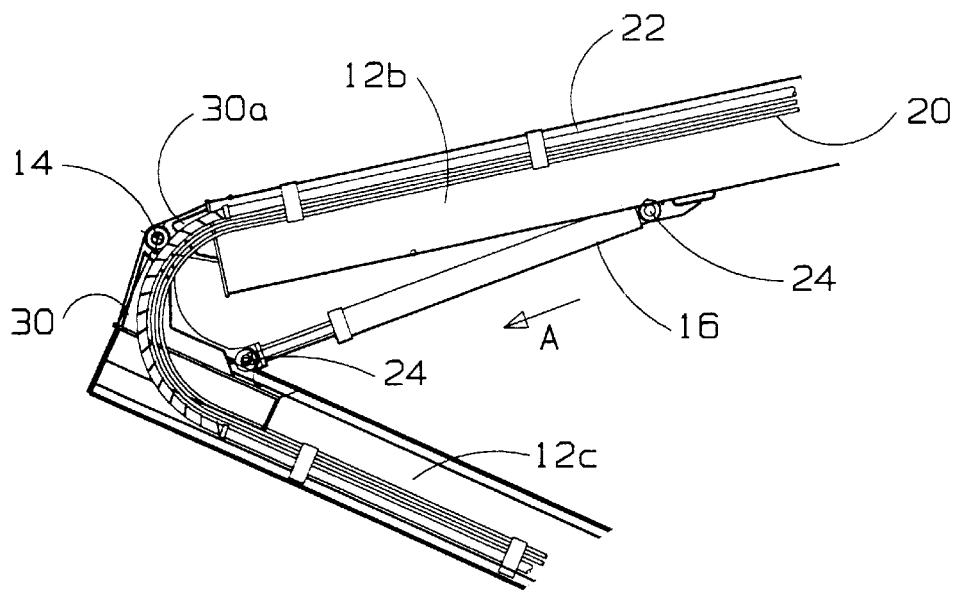
FIG. 8 is an enlarged side elevational view of a joint of the articulated boom.
Figure 9:
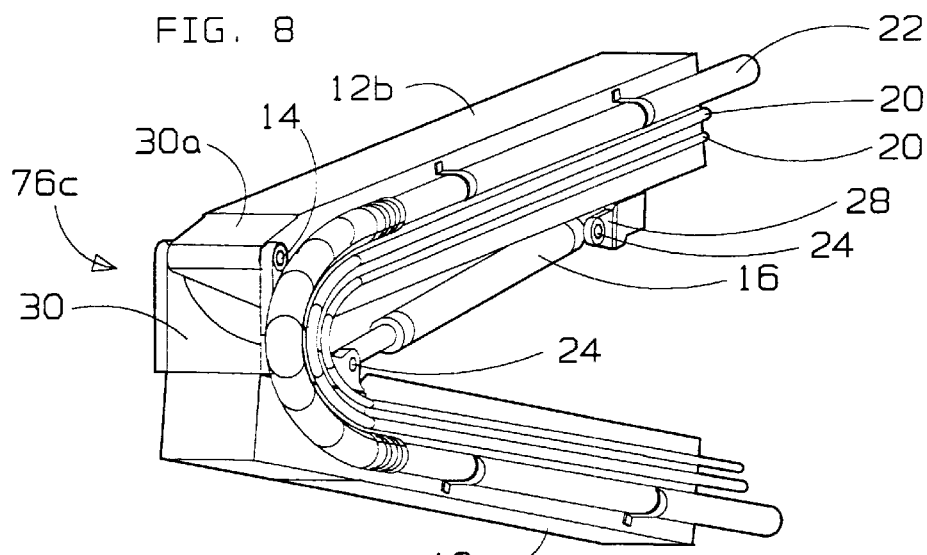
FIG. 9 is a left hand side, isometric view of the joint of the articulated boom of FIG. 8.
Figure 10:
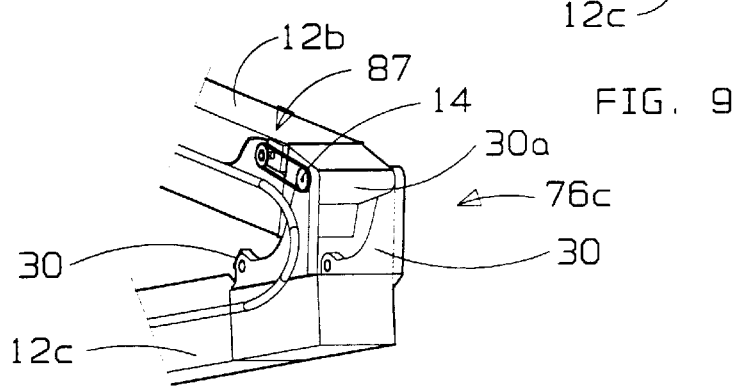
FIG. 10 is a right hand side isometric view of the joint of the articulated boom of FIG. 8.

As seen in FIGS. 1–5, in articulated boom 10 has a longitudinal array of pivotally linked elongate boom sections 12a, 12b, 12c and 12d pivotally linked at their ends by means of hinge pins 14. Adjacent boom sections are selectively articulated in a single plane. Hinge pins 14 are parallel and boom sections 12 are selectively rotated about hinge pins 14 by selective actuation of hydraulic rams 16 acting on the hinged elbows or joints between boom sections. FIGS. 8–10 illustrate in enlarged detail, one embodiment of the hinge mechanism between boom sections 12b and 12c. Hydraulic lines 20 and purge water lines 22 are mounted along the length of the boom sections and looped at the elbows or joints between boom sections to allow relative movement between the boom sections.

Figures 1, 2:
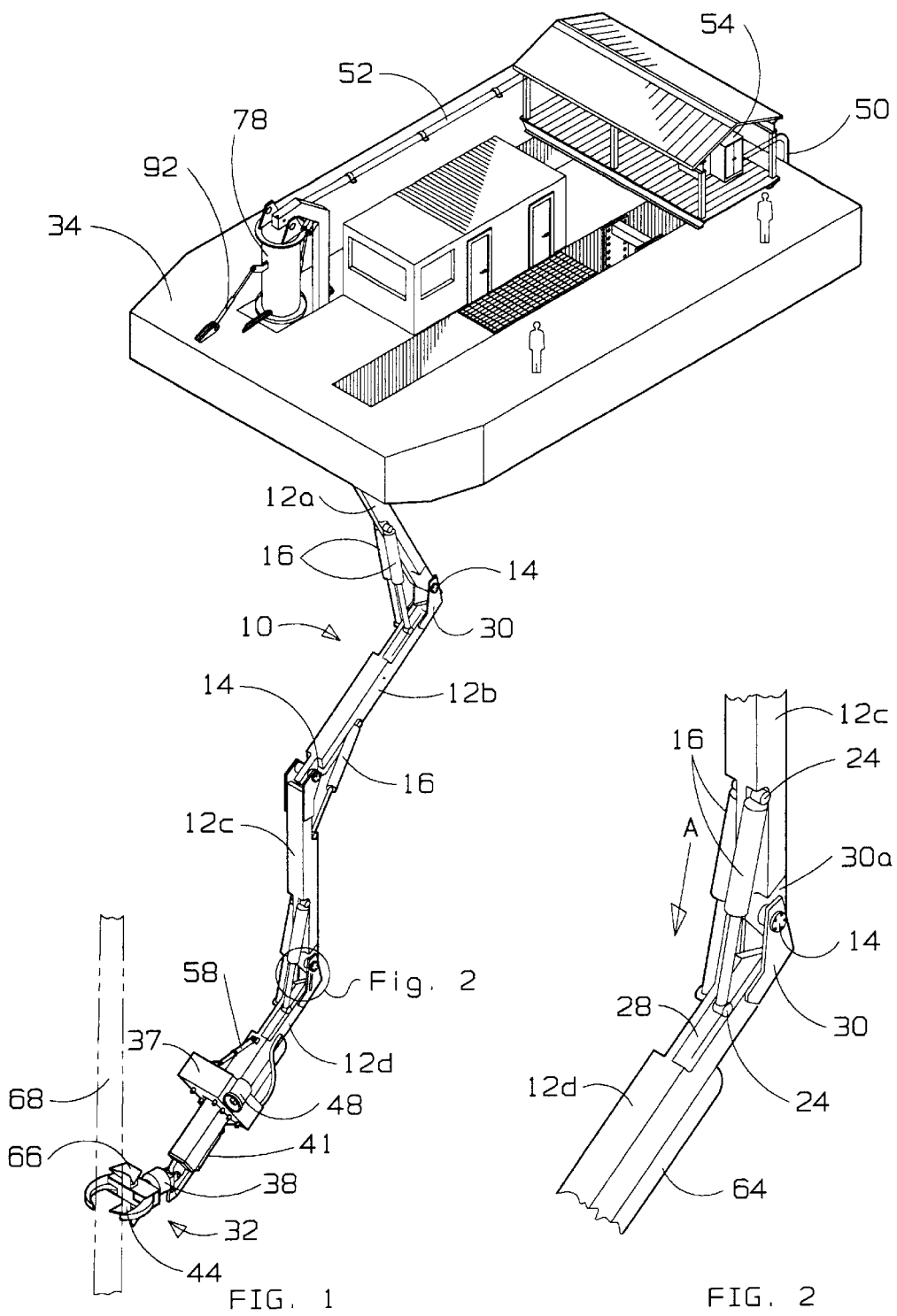
FIG. 1 is an isometric view of a floating barge with the articulated boom and gripping head of the present invention in all extended operating position.
FIG. 2 is an enlarged isometric view from FIG. 1 of the joint between boom sections.
Figure 3:
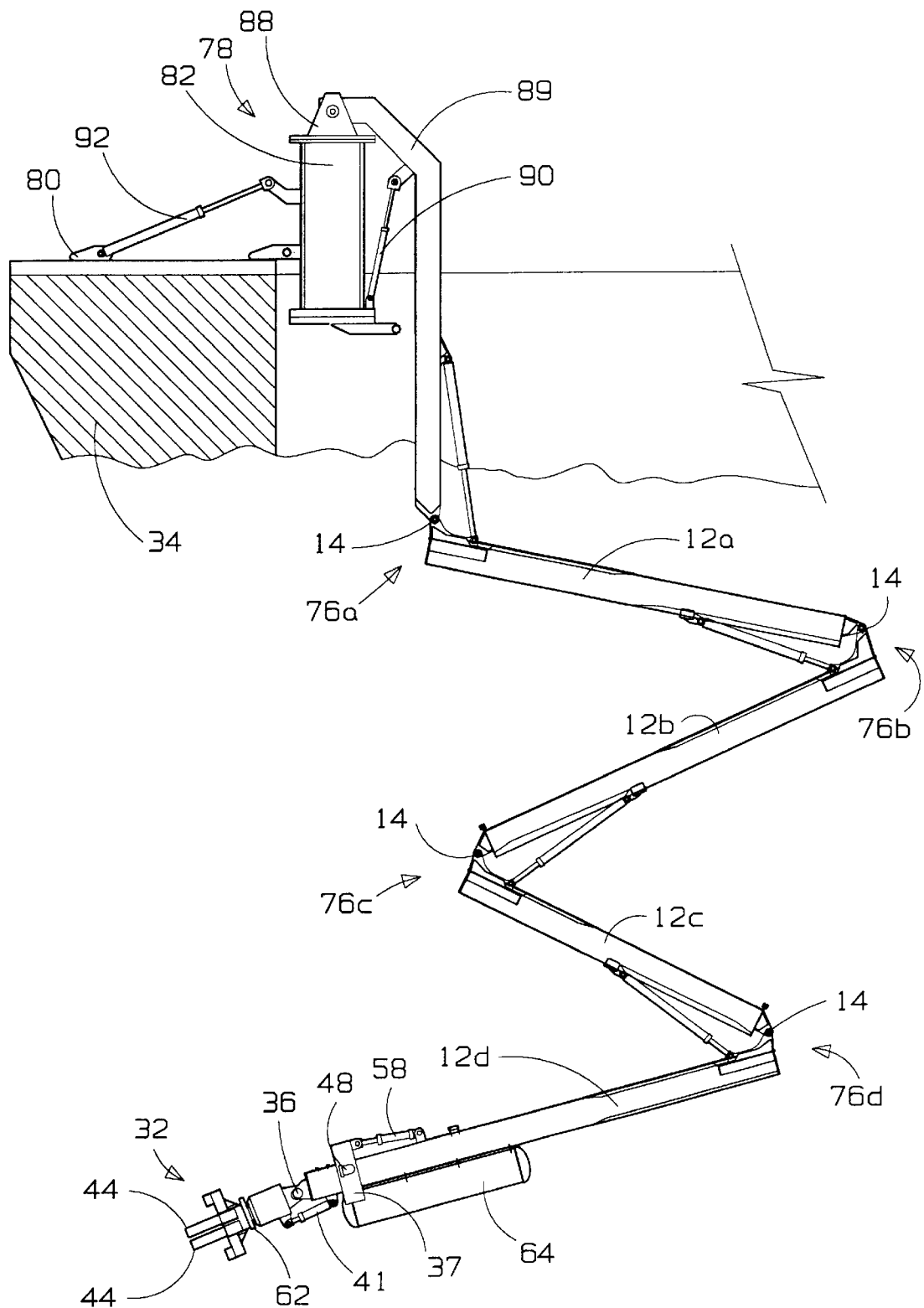
FIG. 3 is an enlarged side elevational view of the articulated boom and gripping head.

The joints between the boom sections of articulated boom 10 can be independently opened or closed by the remote actuation of hydraulic rams 16. Rams 16 are pivotally connected to adjacent boom sections, for example, section 12c and 12d as seen in FIG. 2, by means of pins 24 which are journalled in webs 28.

The joints between boom sections may, as seen in FIGS. 8–10, have hinge pins 14 offset from the ends of the boom sections on opposed pairs of mounting flanges 30 rigidly mounted to one end of a boom sections 12. The cantilevered ends of the opposed pair of mounting flanges 30 have hinge pin 14 journalled therethrough. Hinge pin 14 pivotally mounts nose 30a between flanges 30.

Extension of hydraulic ram 16 in direction A acts through cantilevered ends of mounting flanges 30 at the end of boom sections 12 so as to rotate adjacent boom sections 12 about hinge pin 14. Rotation of boom sections 12 about hinge pins 14 causes articulated boom 10 to either unfold so as to extend head 32 away from barge 34 or so as to fold articulated boom 10 up to, and in one embodiment depicted in FIG. 5 on top of, barge 34.

Head 32 may take the form of many interchangeable attachments such as those, better illustrated by way of example in FIGS. 16 to 24, which will permit remote underwater visual inspection, core sampling, concrete grouting, drilling, venturi dredging and the placement and removal of objects. An example, but not intended so as to be limiting, is head 32, as better seen in FIGS. 1, 6 and 7, which is adapted to grip elongate objects. The frame 40 of head 32 is removably secured to flange 39 which is rotatable by remotely operable hydraulic motor 38. Motor 38 is in turn connected to the distal free end of boom section 12d through a hinge connection 36. In this manner, the gripping head 32 may be readily detached from motor 38 so as to be interchanged with another head.

The frame 40 of head 32 provides structural support for claw hinges 42 upon which are pivotally mounted claws 44. Claws 44 are selectively actuable by claw hydraulic rams 46.

A vision system may advantageously be mounted proximate head 32, for example on the distal free end of boom 12d. The vision system enables an operator to monitor positioning and operation of claws 44 remotely in real time. In one embodiment, without intending to be limiting, the vision system incorporates a video camera and, advantageously, a water purge device. The water purge device has as its function pumping clear water from a remote location, such as the surface of the body of water within which the device is operating, along the articulated boom, to head 32 where the clear water is injected under pressure into the field of view of the video camera. The clear water displaces murky water stirred up by the operation of the boom and head so as to avoid white-out conditions which would otherwise render visual monitoring difficult if not impossible. The field of view of video camera 48 encompasses an area including the area between claws 44 and in a forward direction along claws 44 ahead of head 32. Clear water is collected from a remote location such as through a clear water intake 50 on barge 34 and pumped through purge water line 52 by water pump 54, along purge water lines 22 and thereby alone articulated boom 10. As also seen in FIG. 6b, purge water lines 22 feed clear water purging manifold 37, in one embodiment through flexible tube or pipe. The pressurized purge water from manifold 37 is then injected into the field of view of video camera 48 through nozzles 56 as also seen in FIG. 6a. Video camera 48 may be enclosed in a protective housing. In alternative embodiments, other vision systems may be employed as would be known to those skilled in the submariner arts, for example, acoustic or solar systems, or other sensors employing radiation of other wavelengths.

Clear water purging manifold 37 is journalled on boom 12d for rotation about a generally horizontal axis on pins 38. Rotational movement about pins 38 is accomplished by a hydraulic ram 58 connected between manifold 37 and boom 12d or, alternatively, by mechanical linkage which directly connects the purging manifold 37 to frame 40 of head 32

(not shown). Neutral buoyancy tanks 64, as seen in FIGS. 2–5 and FIG. 6b, assist in maintaining the neutral buoyancy of head 32 and boom 12d.

As can be seen in FIGS. 1, 6 and 7, a V-shaped bracket 66 for cradling therein an elongate object gripped between claws 44 is mounted to frame 40. V-shaped bracket 66 holds an elongate object centered within the "V" and helps to stabilize the elongate object during movement of the boom.

FIGS. 1 and 7 show head 32 in operation. Head 32 is shown in close proximity to submerged elongate object 68. The gripping operation of claws 44 is actuated by hydraulic rams 46. Head frame 40 and claws 44 are held against elongate object 68 by actuation of boom Section 12d. Head frame 40 is oriented so as to engage V-shaped bracket 66 against the surface of submerged elongate object 68 by the operation of hydraulic cylinder 41 which pivots head 38 about a generally horizontal axis on hinge 36. Hydraulic motor 38 rotates head 32 about the longitudinal axis of shaft 38a.

Figure 15:
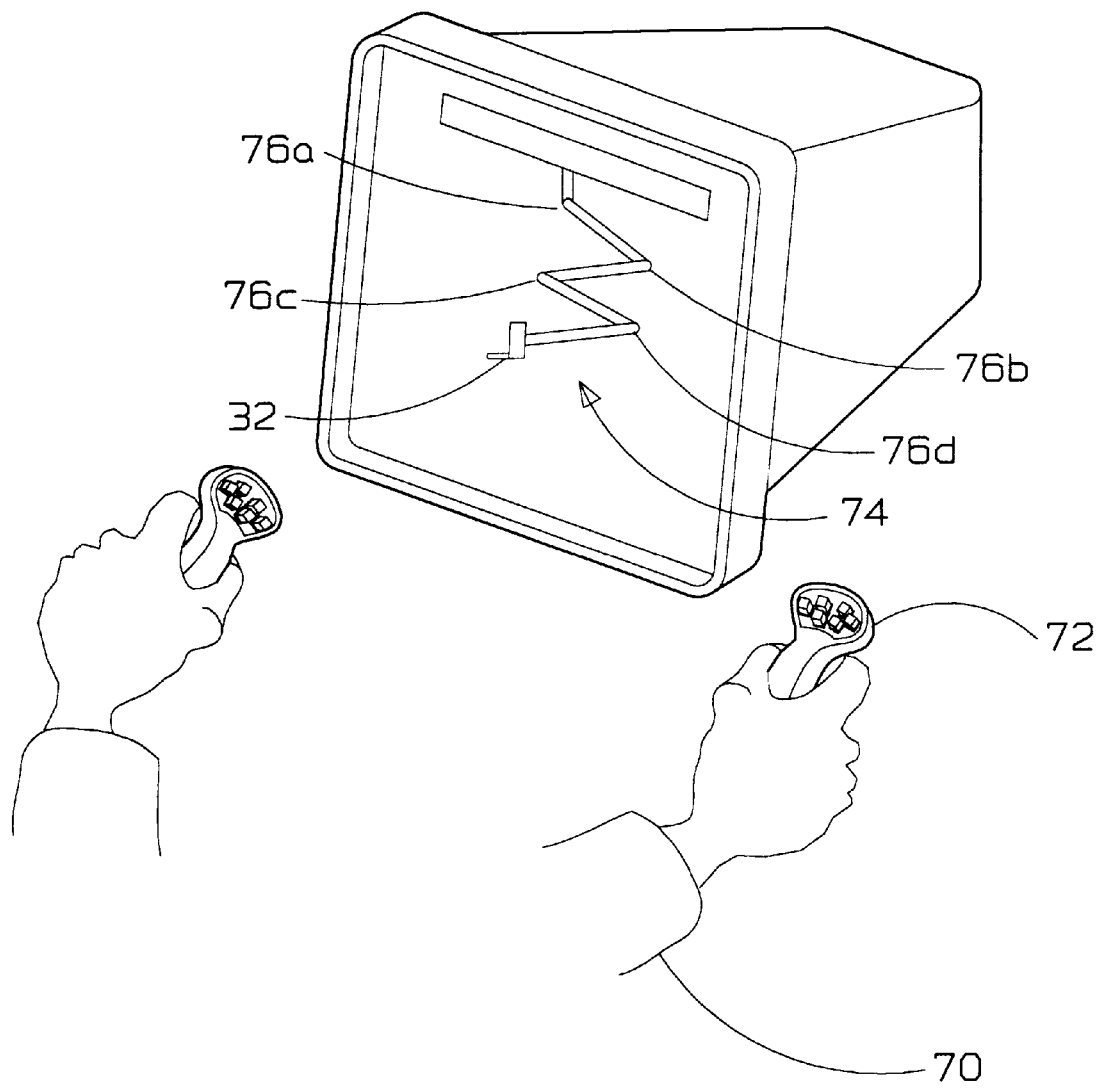
FIG. 15 is a partial perspective view of the remote operation of the articulated boom and gripping head of the present invention.

As seen in FIG. 15, a remote operator 70, who may be situated on barge 34, controls the articulation of articulated boom 10 and head 32 by means of remote controls 72, which, as illustrated, may be an opposed pair of articulated pistol grips. Remote operator 70 monitors a real time display (not shown) of the video image captured by video camera 48. Remote operator 70 may also monitor a real time computer simulation 74 of the deployment status of articulated boom 10 deployed beneath barge 34. Such spacial orientation status information about the deployment of articulated boom 10, combined with the video real time image from video camera 48, provides the information which is of assistance to the remote operator 70.

Inputs required to produce the real time computer simulation 74 may be provided by rotary position transducers known in the art. They may be mounted on the boom tower, at the tower to boom joint, and at boom joints 76a, 76b, 76c, and 76d (see FIGS. 3 and 15), and at the rotation, tilt and grip articulation locations 36 (see FIG. 6), 62 for head 32 (see FIG. 7). The position transducers provide a signal which is proportional to relative movement, both between 0 and 10 volts, to an analog-to-digital converter, and thence to a remote computing device, as for example a computer located on barge 34. The operation of the boom tower is better described below.

Rotary position transducers 87 as shown in FIG. 10 are mounted at the boom joints and may comprise a rotatable gear at the transducer on one boom section and a non-rotatable sprocket mounted to the hinge pin 14 connecting the two boom sections. Pin 14 rotates with one boom section, while the other pinned section of boom is freely rotatable on the hinge pin. The gear and sprocket are connected by a drive chain which rotates cooperatively as the hinge pin is rotated during relative movement of the boom sections.

The enabling software of the present invention, based upon software provided by Wonderware of Irvine, Calif., version 5.6, provides a man/machine interface in the dynamic data exchange (DDE) open architecture. The software is a custom DDE server to display the graphics representing the position in real time of articulated boom 10, and to refresh same in real time. The software, interpolates the position of the boom sections by determining the degrees of rotation of the longitudinal axes of boom sections 12 from a zero point. The software, in the preferred embodiment, computes the position of all boom and head components based on the boom geometry and rotational position at each joint as provided by position transducers, such as position transducers 87, each of which have been previously calibrated throughout the full range of joint motion. Tables 1 and 2, are function flow charts for the Wonderware application software and for the software forming part of the present invention respectively.

In one alternative embodiment pressure transducers provide real time analog inputs to the software so that, once the first pressure transducer at boom joint 76a is calibrated on a particular day, then the inputs from the remaining pressure transducers provide differential pressure information indicative of depth relative to boom joint 76a. This provides the advantage that the depth information is independent of surface conditions such as swells, as the pressure increases at a known rate relative to depth underwater. Assuming the length of boom sections 12 remains constant, the differential pressure measurements indicate the positions of the boom joints relative to the calibrated position and may be thereby converted by the software into degree of rotation information.

In a preferred embodiment, and as better explained below, a float circuit such as depicted in FIG. 15 is incorporated into the hydraulics and actuating software whereby the free end of boom section 12d is translated to compensate for wave action at the water surface and the corresponding motion of barge 34, so as to prevent head 32 being driven into the mud as barge 34 drops between swells.

Figure 4:
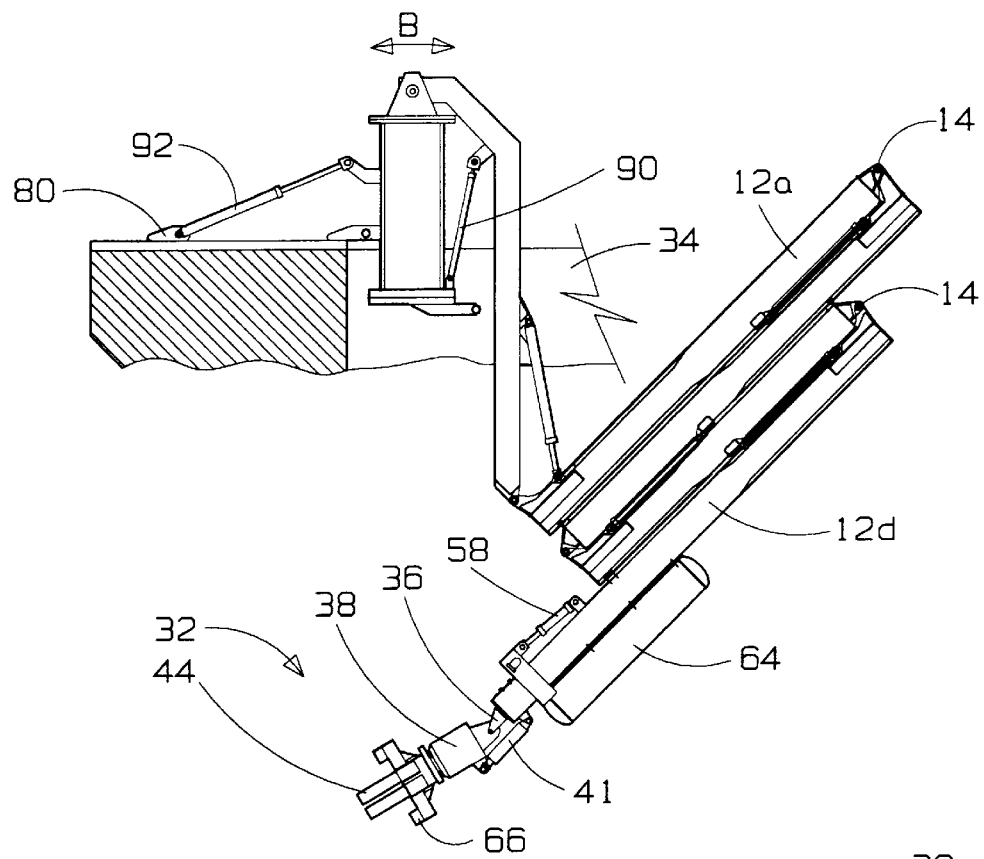
FIG. 4 is a side elevational view of the articulated boom and gripping head of FIG. 3 in a partially deployed position.
Figure 5:
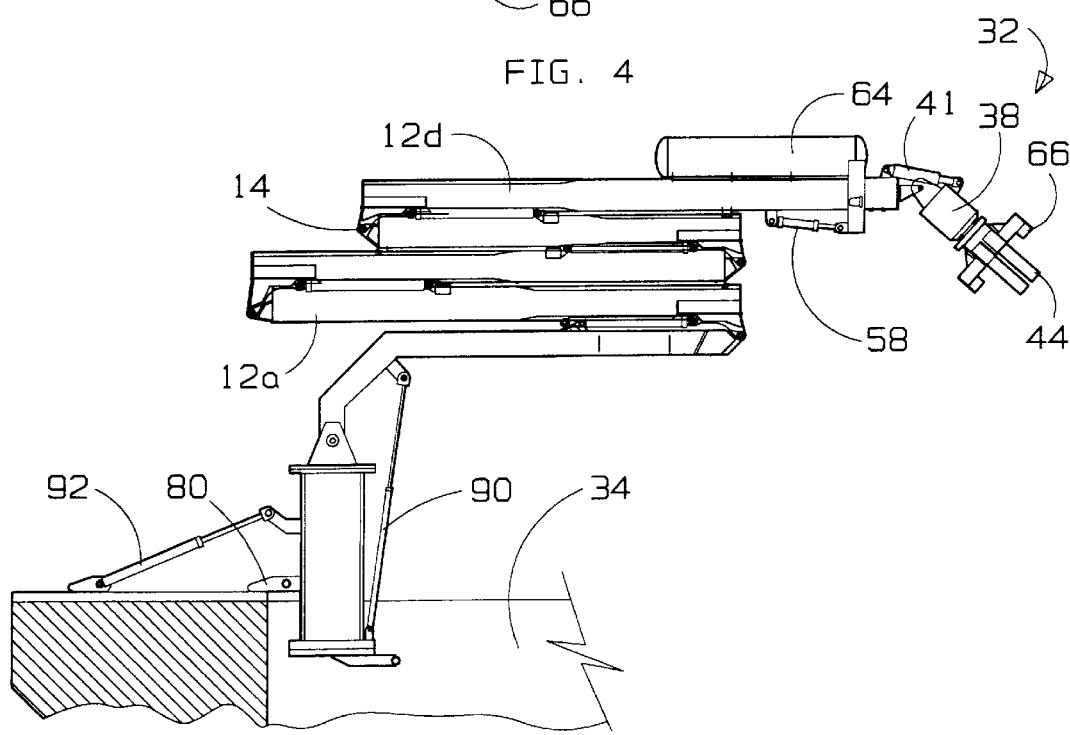
FIG. 5 is a side elevational view of the articulated boom and gripping head of FIG. 3 in a stored position above the deck of the floating barge.

As seen in FIGS. 11–14 boom tower 78 may be secured to the deck of barge 34 by hinged struts 80. Struts 80 cooperate with hydraulic cylinder 92 to permit tower 78 to be pivoted about a generally horizontal axis relative to the deck of barge 34. Sleeve 82 has upper and lower annular supporting collars 86a and 86b respectively. Inner shaft 84 is journalled within outer sleeve 82. Inner shaft 84 is by a top bearing plate 87a supported to allow rotational motion of inner shaft 84 relative to outer sleeve 82. Bottom bearing plate 87b is removably fastened (for example by means of the bolts illustrated) to the bottom of inner shaft 84. Lugs 88 are rigidly mounted to upper bearing plate 87a. Lugs 88 pivotally mount tail 89 of boom 10 to tower 78. Hydraulic cylinder 90 is mounted between tail 89 and outer sleeve 82 of boom tower 78. Cylinder 90 raises tail portion 89 when retracting boom 10. A second hydraulic cylinder 92 is mounted between the deck of barge 34 and outer sleeve 82 of boom tower 78. Cylinder 92 may rotate tower 78 between an upright position as illustrated, and an off-vertical position in an are lying in a vertical plane. That is, tower 78 may be rotated in direction B as seen in FIG. 4.

Figure 11:
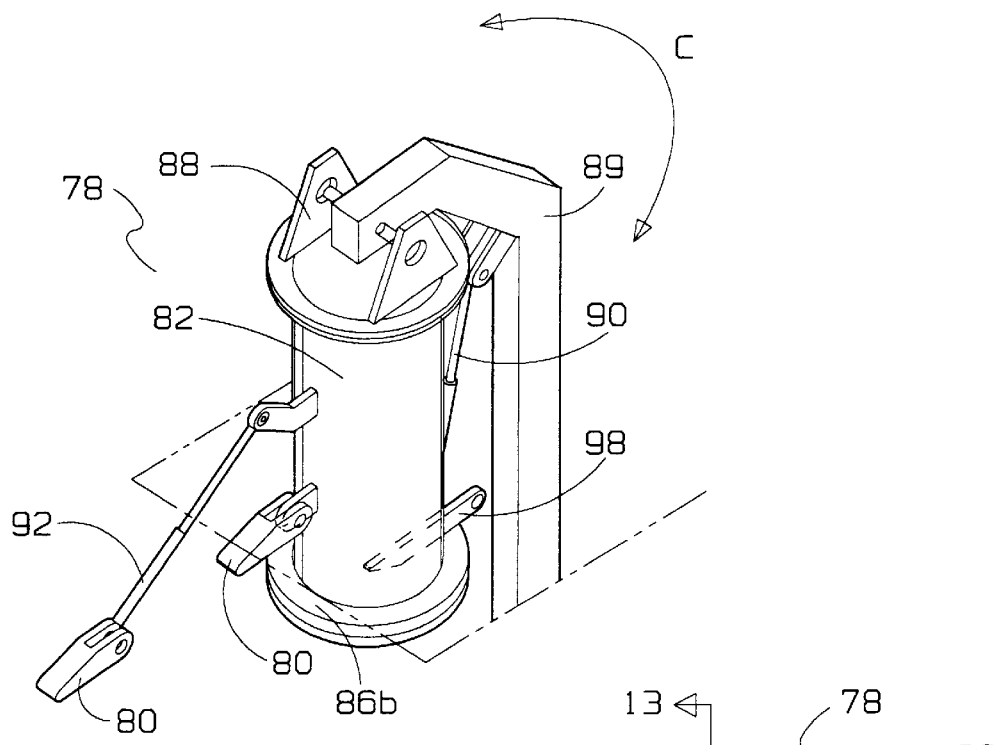
FIG. 11 is an isometric view of the boom tower of the articulated boom.
Figure 12:
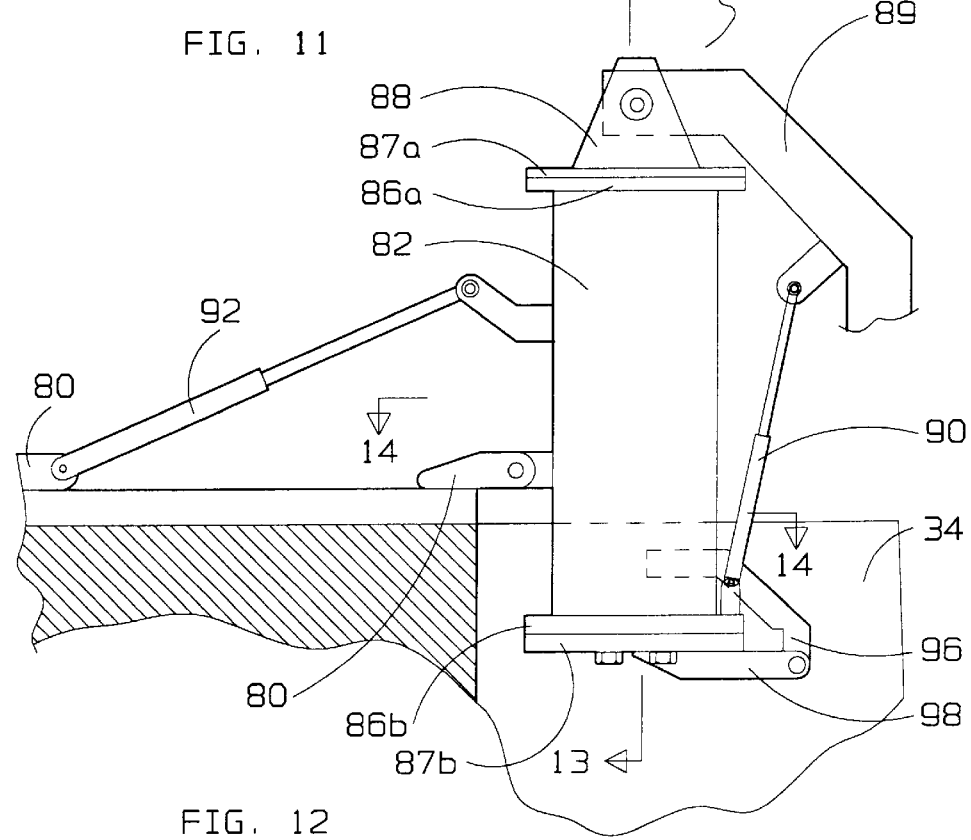
FIG. 12 is an enlarged side elevational view of the boom tower of FIG. 11.
Figure 13:
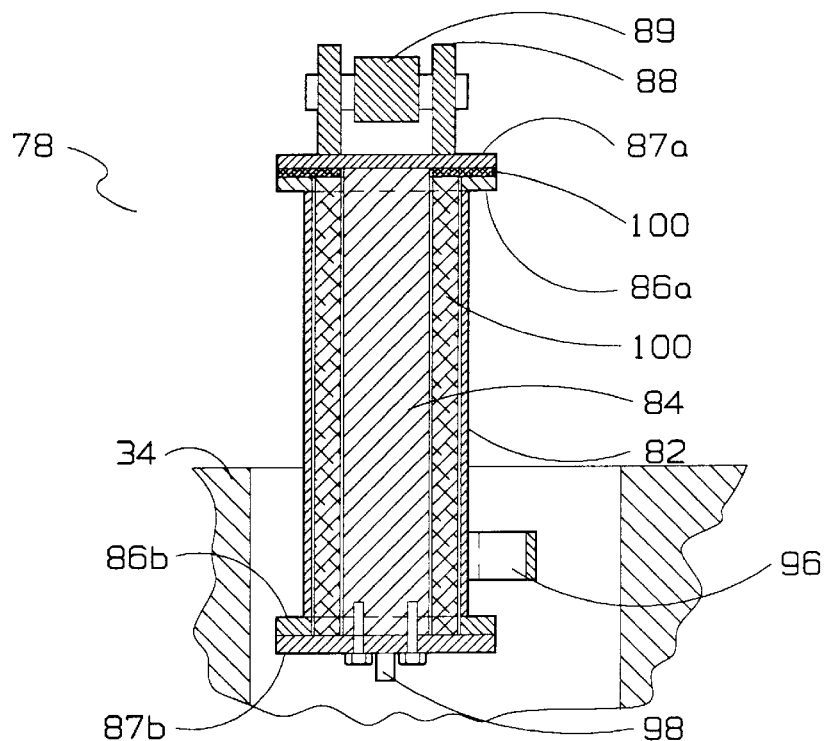
FIG. 13 is a vertical section along line 13—13 in FIG. 12.
Figure 14:
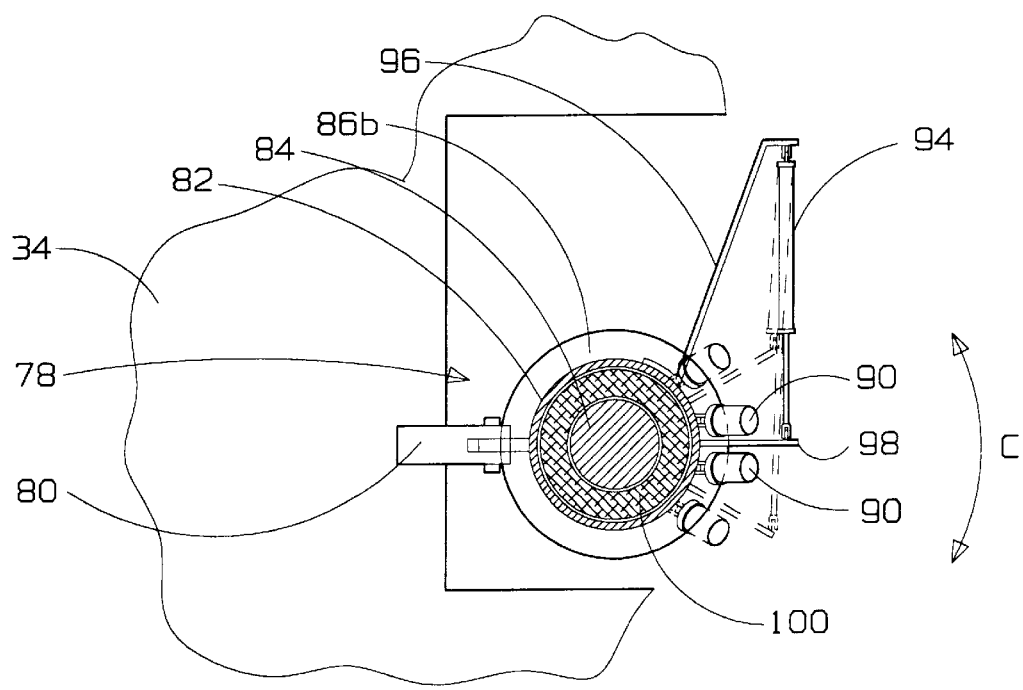
FIG. 14 is a horizontal section along line 14—14 in FIG. 12.

It is advantageous to rotate boom 10 in a horizontal radial are in direction C as seen in FIG. 11 and 14 relative to barge 34, for example in a horizontal 60 degree arc. Arm 96 is mounted to the outer sleeve 82 of tower 78. Rotator lug 98 is mounted to the underside of bottom bearing plate 87b. Hydraulic cylinder 94 is mounted between arm 96 and lug 98, as seen in FIG. 14. Actuation of cylinder 94 rotates the bottom bearing plate relative to the outer sleeve thereby rotating the boom in direction C. That is, since outer sleeve 82 is prevented from rotational movement by the rigid mounting of struts 80 to the deck of barge 34, force applied to rotator lug 98 is transmitted from bearing plate 87b through inner shaft 84 to upper plate 87a and then to the tail 89 of the boom.

Chromium plating of the outer surface of inner shaft 84 and the use of ultrahigh molecular weight plastic inserts 100 between inner sleeve 84 and outer sleeve 82 and between upper supporting collar 86a and top plate 87a, provide low friction bearing surfaces.

Figure 25:
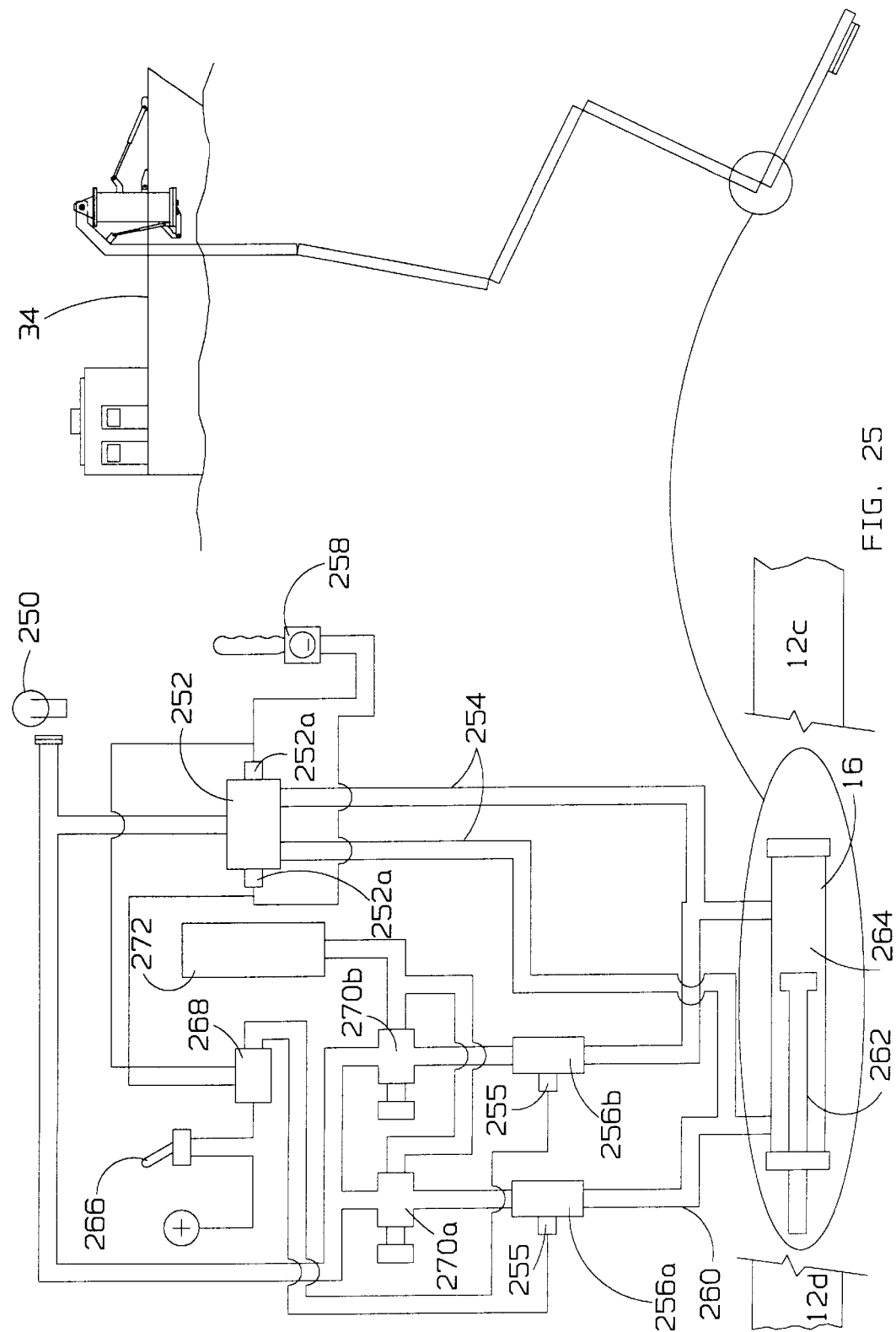
FIG. 25 is a schematic illustration of a float circuit.

The accurate placement and operation of head 32 when mounted to the end of articulated boom 10 can be difficult since the boom is mounted on a floating barge 34 which is subjected to rolling and to vertical and horizontal displacement by wave action. Thus it is advantageous to provide a means for compensating for erratic movement of the boom and head caused by waves or swells on the water surface. In one embodiment of the present invention, this is accomplished by a hydraulic float circuit. The float circuit, as seen in FIG. 25, is incorporated into the regular hydraulic operating circuit for the boom. Also, to maintain lateral stability of the boom, a further float circuit may be incorporated into the operating circuit of the hydraulic ram 94 as seen in FIG. 14, which moves the tail 89 of articulated boom 10 in horizontal are C relative to barge 34.

The float circuit of FIG. 25 translates the water resistance on boom 12d, as it is moved through the water due to wave action on the barge, into at hydraulic fluid pressure differential on each side of the piston within the hydraulic rams 16. Rams 16 control movement or boom 12d. This pressure differential between the two sides of the ram plungers is detected by one of the preset pressure reducing valves. Which of the pressure reducing valves is dependent on which side of the plunger the pressure increase is on. This is dependent on which way boom 12d is being moved through the water, i.e. either up or down.

The float circuit is in operation when power switch 266 is in the "on" position and the operator is not engaging boom 12d, that is, when the boom is expected to be stationary relative to boom section 12c.

Figure 25A:
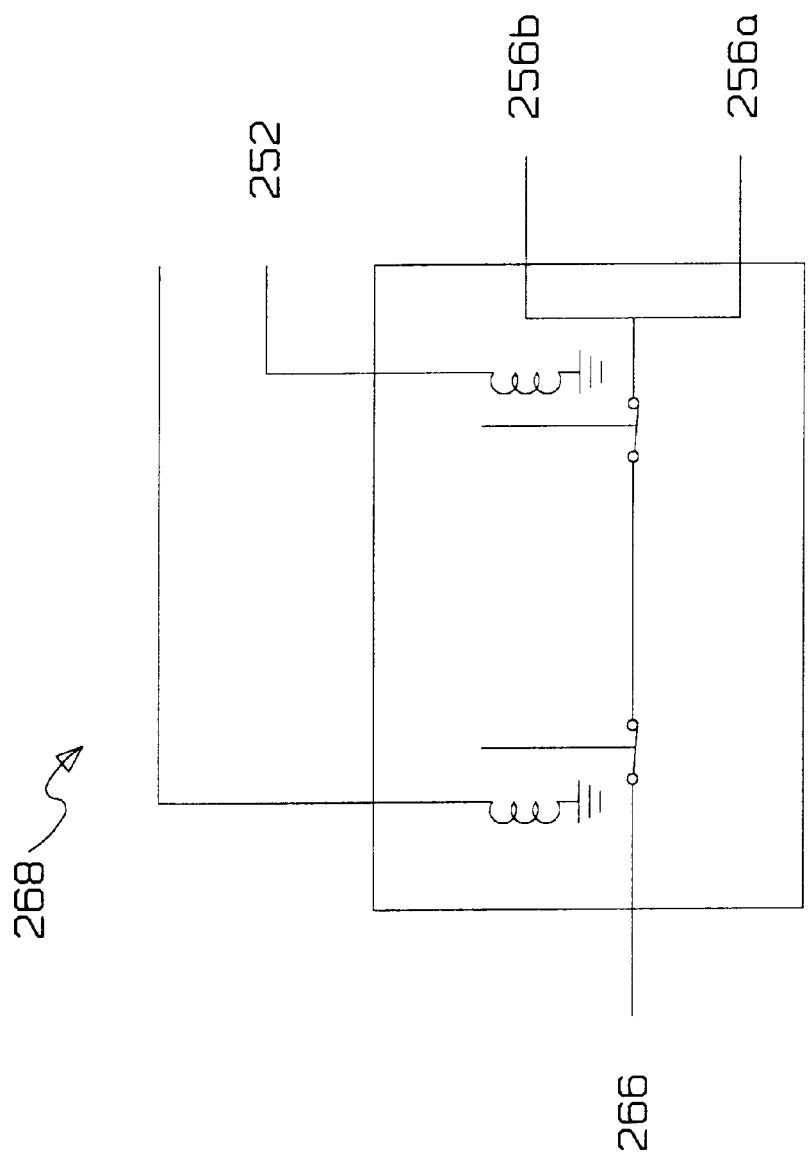
FIG. 25a is a schematic illustration of the relay of the float circuit of FIG. 25.

As can be seen illustrated in FIG. 25, pump 250, located on the barge 34, supplies pressurized hydraulic fluid to the system. Flow control valve 252 is operated by electrical solenoids 252a and regulates fluid flow to the normal operating hydraulic drive circuit 254. The solenoids 252a are driven solely by the operator joystick 258, supplying power to either solenoid depending on the direction that the operator desires the boom 12d to be moved. Solenoids 255 control flow control valves 256a and 256b of the float circuit 260. Solenoids 255 are driven solely by the operator on/off power switch 266. With switch 266 in the "on" position, electrical power is supplied to valves 256a and 256b through a set of normally closed contacts of a contact relay 268, better seen in FIG. 25a. It is important to note that the signal lines providing electrical power to the normal hydraulic circuit control valve 252 also control the switching coil of the contact relay 268. The result of this connection is that even with the float circuit switch 266 in the "on" position, the activation of the normal circuit flow control valve 252 fires the control switch of the relay opening the normally closed contacts. This disables the float circuit flow control valves 256a and 256b effectively shutting off the reduced fluid pressure to rams 16 while the boom 12d is being operated. Also note, with respect to coupled rams 16, float circuit 260 is connected in parallel to both rams 16 in order to avoid duplication of the float circuit.

An example of float circuit operation is as follows:

Pressure from the pump 250 is supplied to the pressure reducing valves 270a and 270b at all times. With switch 266 in the "on" position the state of the system is as follows:

(a) electrical power is supplied to the float circuit flow control valves 256a and 256b through switch 266 and the normally closed contacts of contact relay 268;
(b) reduced pressure from the pressure reducing valves 270a and 270b is delivered to both sides of ram 16 through the flow control valves 256a and 256b;
(c) wave action occurs moving the vessel and arm in the upward direction;
(d) water restriction causes increase in fluid pressure on one side of rain plunger 262;
(e) pressure reducing valve 270a shunts excess fluid pressure to the reservoir 272;
(f) flow from pressure reducing valve 270b allows nominal pressure to increase fluid displacement on the other side of plunger 262, within cavity 264, causing the ram plunger to move opposite the original force of the water restriction.

This process is exactly reversed when the wave action is in the opposite direction.

Figure 16:
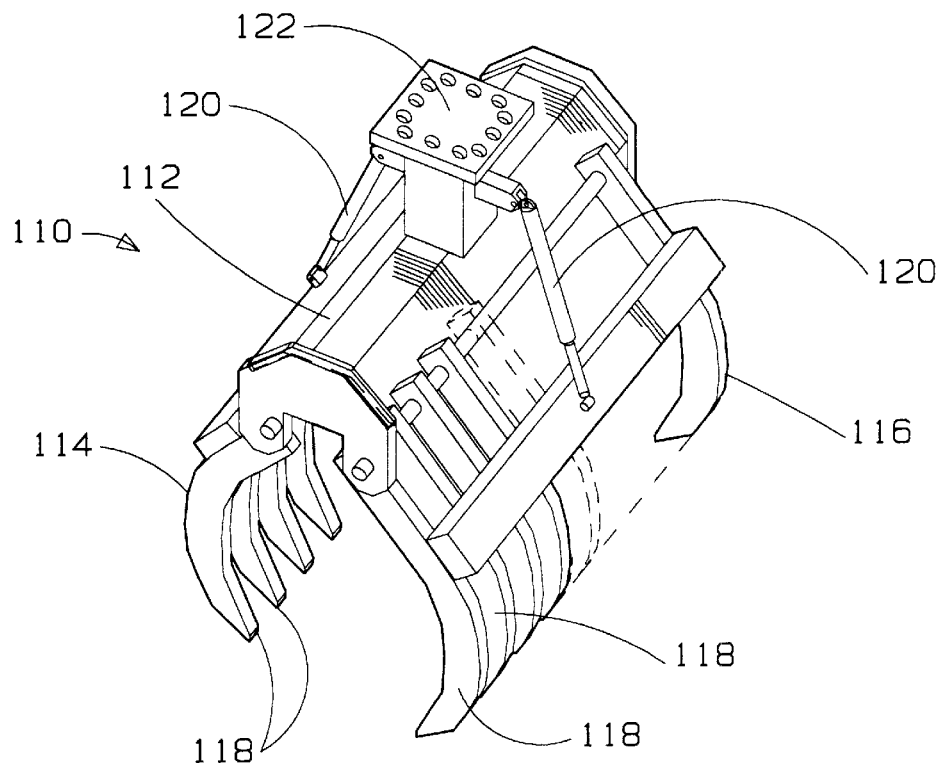
FIG. 16 is an isometric view of a clam shell rake alternative head attachment.
Figure 16A:
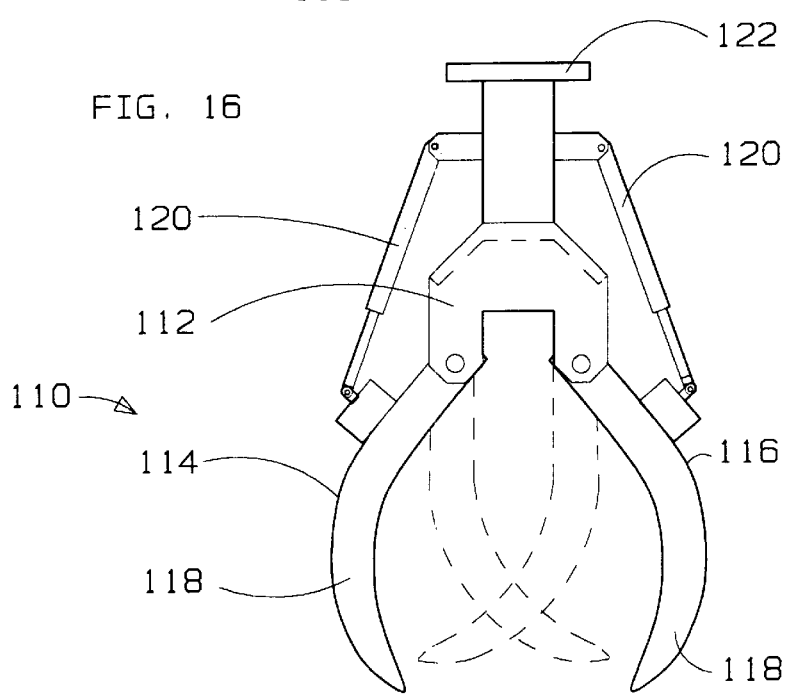
FIG. 16a is an end view of the clam shell rake of FIG. 16.

It is anticipated that boom 10 and head 32 may be utilized to perform a variety of tasks in an underwater environment, for example, in situations that might pose a safety hazard to divers or submersible watercraft. Such tasks may require a variety of different heads 32 which can be readily secured to the end of articulated boom 10. One form of head, as illustrated in FIGS. 16 and 16a is a clam-shell rake 110. Rake 110 has a frame 112 to which are rotatably connected opposed jaws 114 and 116. The jaws have a series of arcuately shaped fingers 118 which are operable by hydraulic cylinders 120. Fingers 118 on jaw 114 are offset relative to the fingers on the other jaw 116 so as to allow meshing as illustrated by broken lines in FIG. 16a. Rake 110 may be secured to the articulated boom 10 by flange 122.

Figure 17:
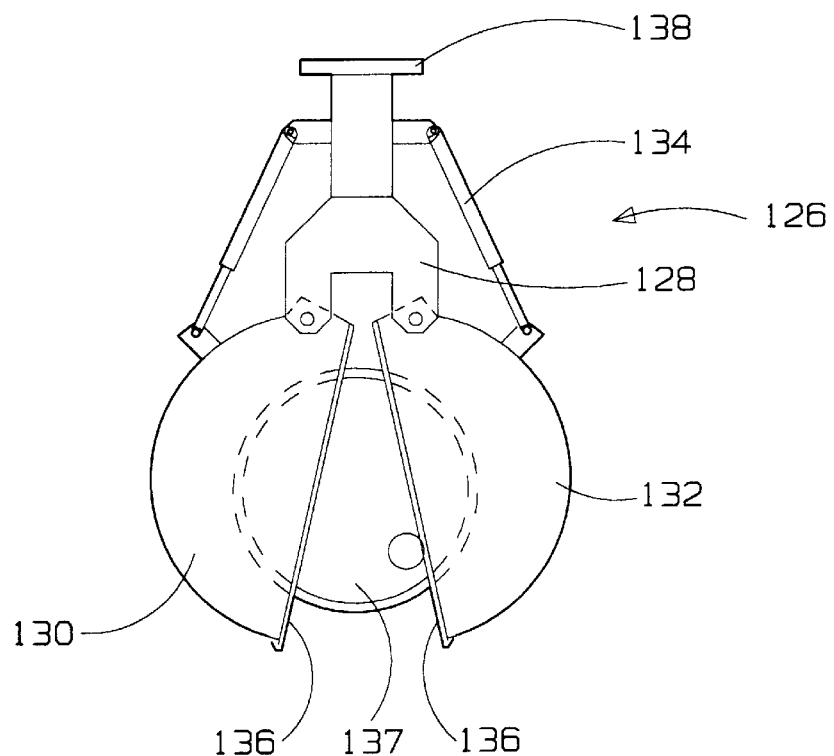
FIG. 17 is an end view of a barrel removal overpack alternative head attachment.
Figure 17A:
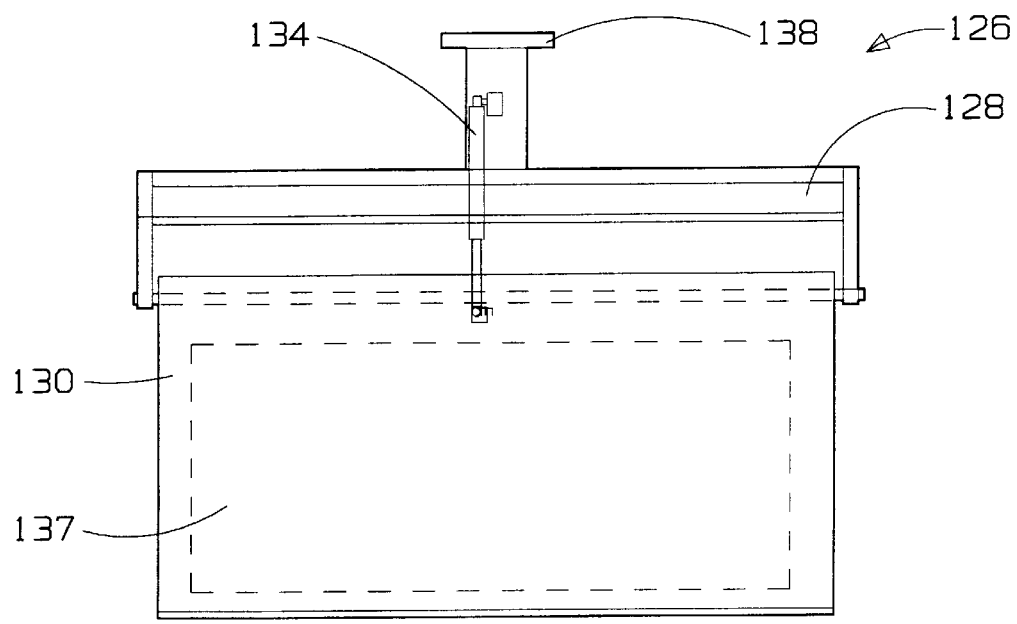
FIG. 17a is a side elevation of the barrel removal overpack head of FIG. 17.

Another form of head, as illustrated in FIGS. 17 and 17a, is an overpack 126. Overpack 126 has a frame 128 to which are pivotally connected opposed scoops 130 and 132. Scoops 130 and 132 are rotated on flame 128 by hydraulic cylinders 134. The opposing perimeter edges of the open faces of scoops 130 and 132 are provided with a flexible strip 136 which, when scoops 130 and 132 are rotated to a closed position by hydraulic cylinders 134, seal the perimeter edges to prevent contents escaping from inside the overpack. This overpack can be utilized to retrieve cylindrical shaped objects such as drum 137 front an underwater environment. It is anticipated that the overpack can also be used for munitions retrieval, and in this application, the interior of the scoops would be lined with cushioning material or an inflatable liner to prevent jarring of the retrieved munitions. The construction or the overpack would be sufficiently explosion resistant to provide protection for the end of the articulated boom 10. Connecting flange 138 may be provided with a quick release mechanism, or may be fabricated from deformable material which will prevent vibrations from an explosion being transmitted to boom 10.

Figure 18:
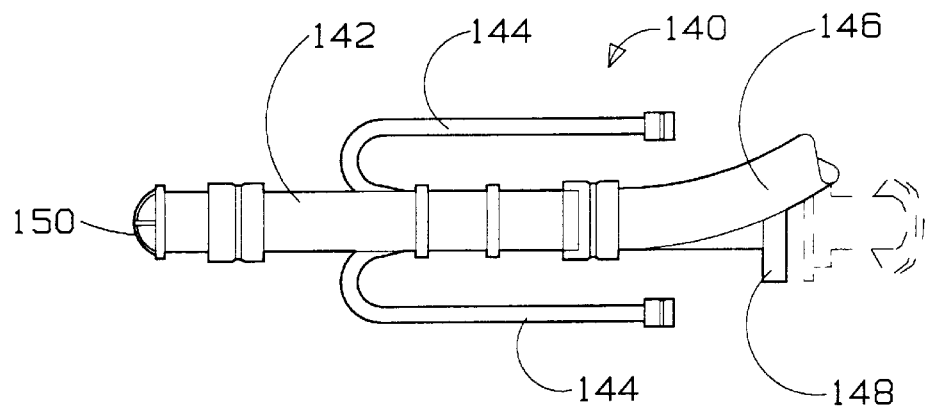
FIG. 18 is a plan view of a venturi suction dredge alternative head attachment.
Figure 18A:
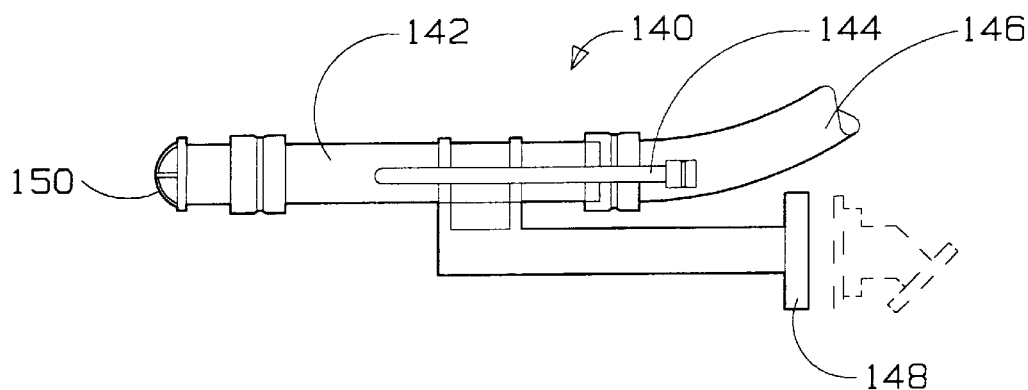
FIG. 18a is a side view of the venturi suction dredge head of FIG. 18.

Another form of head, as illustrated in FIGS. 18 and 18a, is suction dredge 140. Suction dredge 140 has a rigid tubular body 142. Water inlet lines 144 supply pressurized water into body 142 directed into discharge hose 146. A venturi effect within body 142 causes a vacuum within body 142, in particular at the vacuum orifice or inlet 150. Dredge 140 can be connected to articulated boom 10 by a connecting flange 148. Water lines on boom 10 utilized to supply purge manifold 37 can be used to supply water to inlet lines 144. A vacuum at nozzle inlet 150 may be used to clean underwater objects.

Figure 19:
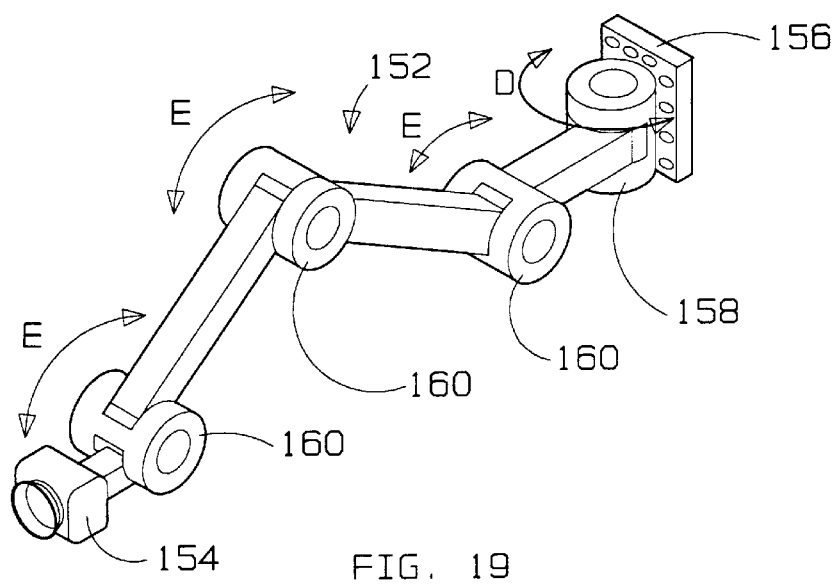
FIG. 19 is an isometric view of an articulated viewing arm alternative head attachment.

Another form of head, as illustrated in FIG. 19 is an articulated viewing arm 152. Arm 152 has a camera 154 or the like mounted at its outer end. Flange 156 at the other end provides for mounting to boom 10. Independent articulation of the segments of arm 152 is accomplished by gear motors. Motor 158 provides articulation in direction D, while motors 160 provide articulation in direction E. This viewing arm, when mounted to articulated boom 10, permits minute adjustments to both arms 152 and camera 150 for viewing within confined situations.

Figure 20:
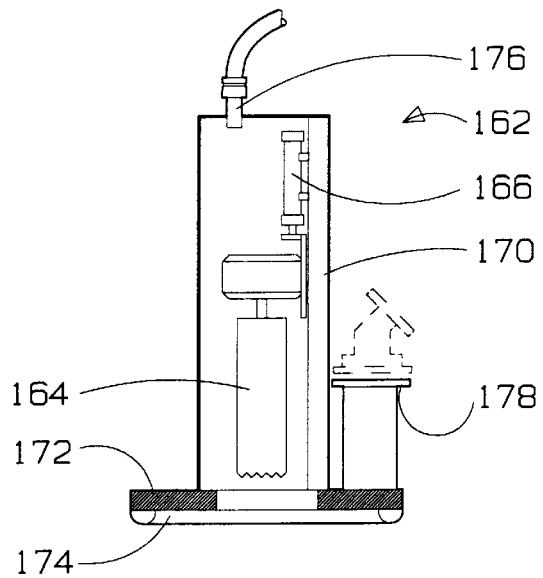
FIG. 20 is a sectional view of a core sampling drill alternative head attachment.

Another form of head, as illustrated in FIG. 20, is a core sampling head 162. A coring drill 164, which is operated by a hydraulic motor, is extended or retracted relative to a working surface by hydraulic cylinder 166. Cylinder 166 is mounted within housing 170. Housing 170 has at one end a rigid base 172 which contains a perimeter seal 174 and at the other end has hose connector 176. Flange 117 provides connection to articulated boom 10.

In operation articulated boom 10 positions core sampling head 162 at the location at which a core sample is to be taken. Hose connection 176 is connected to either the purge water line 22 on boom 10 or a separate hose on boom 10 which is connected to a water pump on the barge. When the pump is operated to pump water out of core sampling head 162, the vacuum created by seal 174 holds the head 162 tightly against the workplace as coring drill 164 cuts the core sample. The core sample is held within drill 164 until head is raised to the surface by boom 10.

Figure 21:
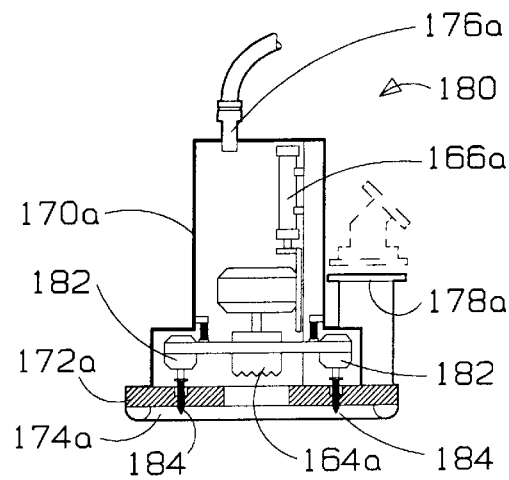
FIG. 21 is a sectional view of a fluid extraction alternative head attachment.

Extraction head 180, as illustrated in FIG. 21 is an adaptation of head 162 which can be attached to articulated boom 10 and positioned against the surface of a submerged container, such as an oil tanker or the like, to initially effect a permanent sealed attachment to the container, secondly to gain access to the inside of the container and thirdly to extract by suction the contents of the container. Drill 164a, operated by a hydraulic motor, is extended or retracted relative to the surface to be drilled by a hydraulic cylinder 166a supported within a housing 170a. Housing 170a has at one end, a rigid base 172a containing a perimeter seal 174a and at the opposite end has a hose connection 176a. Connection to articulated boom 10 is provided by flange 178a. Also positioned within housing 170a are hydraulically operated motors 182 that when operated rotate to drive lagbolts 184, into the outer surface of the container.

When articulated boom 10 of this invention positions the extraction head 180 against the side of a submerged container water is pumped out of housing 170a through hose connection 176a. The resulting vacuum causes seal 174a to isolate the inside of housing 170a from the surrounding water environment. Motors 182 are activated and lagbolts 184 are screwed into the container to permanently attach extraction head 180 to the container. Once extraction head 180 is securely fastened to the container, articulated boom 10 may be released. Drill 164a is positioned by hydraulic cylinder 166a to cut through the container and the contents of the container can then be pumped to the surface through a hose connected to hose connection 176a.

Figure 22:
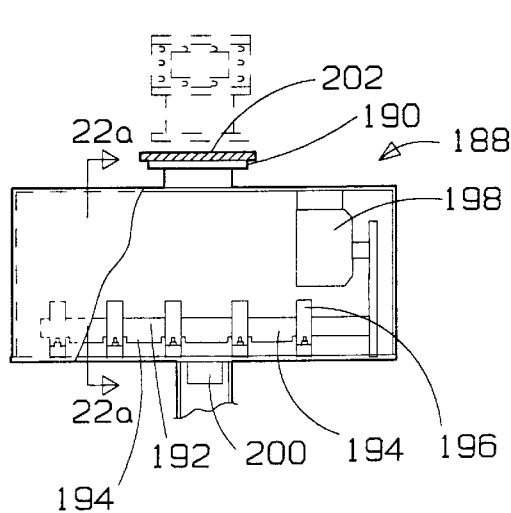
FIG. 22 is a side elevation, partially broken away, of a vibrator alternative head attachment.
Figure 22A:
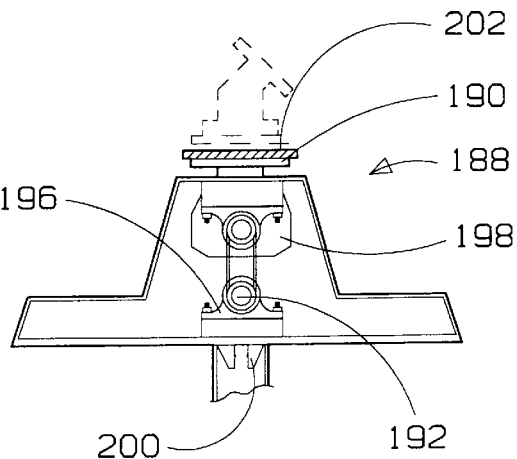
FIG. 22a is a sectional view along line 22a—22a in FIG. 22.

A vibrator head 188 as illustrated in FIGS. 22 and 22a can be attached to articulated boom 10 by means of connecting flange 190. Head 188 is vibrated by shaft 192 which has eccentric lobes 194 formed thereon, and which is connected through bearings 196 to the frame of head 188. Shaft 192 is rotated by hydraulic motor 198 tapered projections 200 extending from the underside of the housing of vibrating head 188 can be utilized to position hollow steel pilings or the like during vibrating placement. A gasket 202 which is designed to reduce the transmission of vibrations is secured between connecting flange 190 and articulated boom 10.

Figure 23:
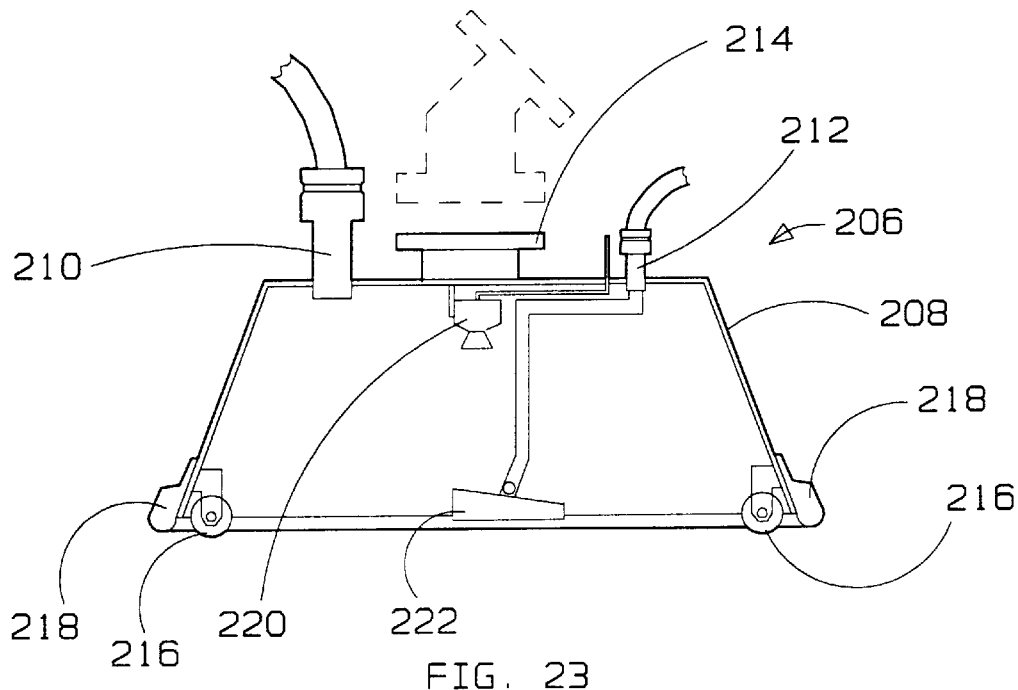
FIG. 23 is a sectional view of a grout application head.

Illustrated in FIG. 23 is a sectional view of a grout application head 206 which has a frame 208, a water hose connection 210 and a grout hose connection 212. Flange 214 allows the head 206 to be connected to articulated boom 10. Head 206 is supported by rollers 216 which are slidably mounted to the inside of frame 208, at the end opposite connecting flange 214. A perimeter seal 218 is secured to the outside of frame 208. A viewer 220 and a grout application head 222 are also mounted within head 206.

The grout application head is placed on a surface by articulated boom 10 of this invention and can be moved over the surface with rollers 216 in contact with the surface. During movement over the surface the integrity of the surface can be inspected through viewer 220. When grout application is required, the articulated boom 10 of the present invention holds the grout application head against the surface as sufficient pressure is applied to head 206 the rollers, which may be spring loaded or similarly forced to normally extend outwardly of the lower edge of frame 208 are depressed, inwardly permitting seal 218 to contact the surface to which grout is to be applied. Water can then be pumped from the inside of frame 208 through hose connection 210 to enable head 206 to adhere to the surface by vacuum. Grouting material can then be injected through grout application head 222.

Figure 24:
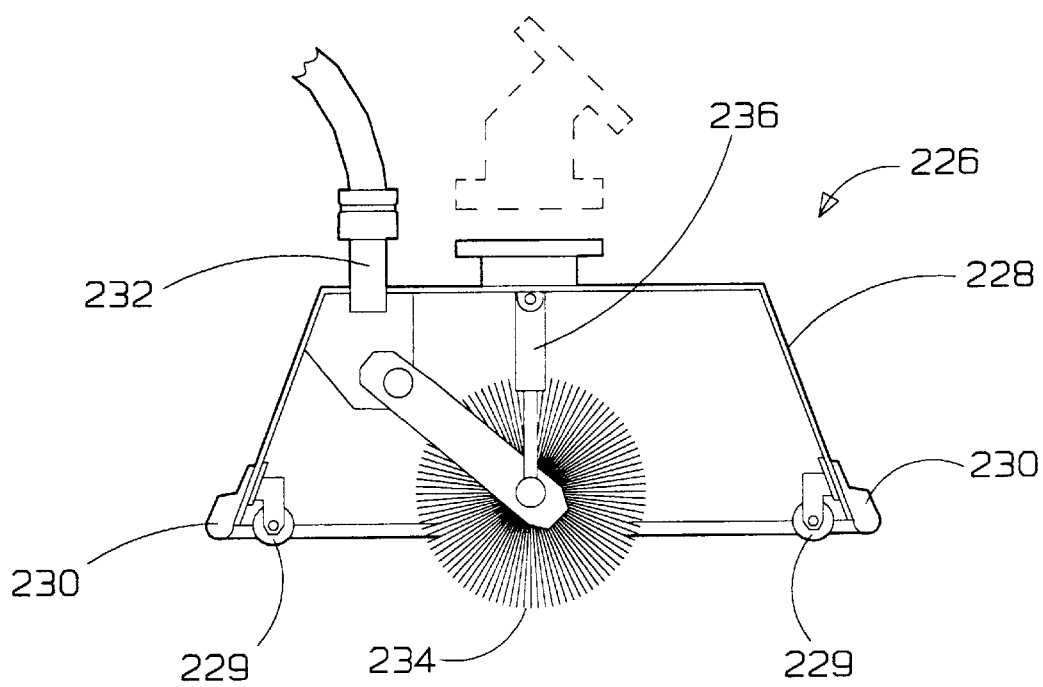
FIG. 24 is a sectional view of a surface stripping head.

As can be seen in FIG. 24, a surface cleaning head 226 is illustrated in a sectional view. Head 226 has a frame 228, internally mounted and inwardly depressible rollers 229, a perimeter seal 230 and hose connection 232 which operate in an identical manner to the same components previously described in the operation of grout application head 206. A wire brush 234 or other abrasive tool, which is rotated by a hydraulic motor (not shown), is pivotally mounted to frame 228 and brought into contact with a surface by hydraulic cylinder 236. Pumping water out of head 226 through hose connection 232 permits head 226 to be positioned against a surface to be cleaned by vacuum pressure. During the cleaning of a surface, or the removal of contaminants from a surface, water flow may be reversed through hose connection 231 to break the vacuum scat against the surface. When seals are free of the surface being cleaned water may again be pumped out of head 226 thereby removing contaminants along will the water.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An articulated boom and utility head for manipulating objects underwater, comprising:

a free floating platform;

an articulated arm mounted at a first end thereof to said platform;

a remotely operable utility head mountable at a second end of said arm;

at least one sensor mounted to said articulated arm to provide information to a remote operator as said arm is remotely operated under water;

means for stabilizing said second end of said articulated arm so that said utility head, when mounted to said second end, maintains a substantially fixed position relative to an underwater object, independent of movement of said first end of said arm.

2. The device of claim 1 wherein said at least one sensor comprises a position sensor and an imaging sensor.

3. The device of claim 1 wherein said imaging sensor is a visual sensor mounted on said arm in proximity to said second end of said arm and is aligned to provide said remote operator with a field of view in front of said utility head.

4. The device of claim 3 further comprising a means for dispersing suspended detritus, which detritus would, if not dispersed, occlude said field of view.

said means for dispersing detritus mounted to said arm in proximity to said second end.

5. The device of claim 4 wherein said means for dispersing detritus comprises a clear water manifold mounted on said boom in proximity to said utility head, said manifold supplied with clear water under pressure, by a water conduit from a water source remote from said second end, a plurality of nozzles mounted on said manifold and aligned to direct said clear water into said field of view of said imaging sensor.

6. The device of claim 5 wherein said clear water manifold is pivotally mounted to said boom, a manifold actuator mounted between said manifold and said boom for selective pivoting of said manifold according to remote control inputs by said operator.

7. The device of claim 1 wherein said boom is a longitudinally extending array of elongate, pivotally linked, rigid boom segments, said boom segments pivotally linked at their ends, boom segment actuators cooperating between adjacent boom segments and remotely actuable by said operator.

8. The device of claim 1 wherein said at least one sensor includes rotary transducers mounted at articulated joints between said boom segments, said rotary transducers for sensing relative rotational movement of said boom segments about said joints and for providing a corresponding signal for transmission to a remote location for use by said operator.

9. The device of claim 7 wherein said boom segments are rotated relative to one another by actuation of hydraulic rams and said hydraulic rains are actuated by means of a primary hydraulic circuit, and wherein said means for stabilizing said second end comprises a hydraulic float circuit cooperating with said primary hydraulic circuit.

10. The device of claim 1 wherein said utility head comprises selectively operable claws.

11. The device of claim 1 wherein said utility head comprises a selectively operable clam shell rake.

12. The device of claim 1 wherein said utility head comprises a selectively operable overpack.

13. The device of claim 1 wherein said utility head comprises a selectively operable suction dredge.

14. The device of claim 1 wherein said utility head comprises a selectively articulatable viewing arm.

15. The device of claim 1 wherein said utility head comprises a selectively operable core sampling head.

16. The device of claim 1 wherein said utility head comprises an extraction head.

17. The device of claim 1 wherein said utility head comprises a selectively operable vibrator head.

18. The device of claim 1 wherein said utility head comprises a selectively operable grout application head.

19. The device of claim 1 wherein said utility head comprises a selectively operable surface cleaning head.

20. An articulated boom and manipulatable utility head for underwater operation when deployed from a floating vessel, comprising:

a plurality of boom segments, each boom segment of said plurality of boom segments pivotally mounted at ends thereof to adjacent boom segments, a first end of said articulated boom mountable to said floating vessel, a second end of said articulated boom, opposite said first end, adapted for mounting of said manipulatable utility head thereon, first actuators mounted between said adjacent boom segments for selective relative rotation of said adjacent boom segments relative to each other, second actuators cooperating with said second end of said boom and said utility head when mounted thereon for selective actuation of said utility head, at least one sensor mounted to said boom for relaying sensed information to a remote operator, said first and second actuators remotely actuable by control inputs from said operator.

21. The device of claim 20 wherein said at least one sensor comprises at least one position sensor mounted to said boom to provide boom position information to said operator, and an imaging sensor to provide environmental information to said operator from an underwater environment in proximity to said utility head.

22. The device of claim 21 wherein said imaging sensor is a visual imaging camera and said device further comprises a means for clearing a field of view of said camera.

23. The device of claim 22 wherein said means for clearing a field of view of said camera comprises means for injecting clear water into said field of view of said camera.

24. The device of claim 23 wherein said means for injecting clear water into said field of view of said camera comprises at least one water nozzle mounted adjacent said second end of said boom, a pressurized water supply coupled to said at least one water nozzle.

25. The device of claim 24 wherein said means for injecting clear water into said field of view of said camera further comprises a water manifold mounted to said boom adjacent said second end, said at least one waiter nozzle mounted to, so as to cooperate with, said water manifold, said water supply coupled to, so as to cooperate with, said water manifold.

26. The device of claim 25 wherein said water manifold is a rigid container pivotally mounted to said boom, a third actuator mounted between said rigid container and said boom for selective pivoting of said at least one water nozzle so as to direct a stream of water from said at least one nozzle into said field of view.

27. The device of claim 21 wherein said boom segments of said plurality of boom segments are pivotally mounted to each other by a corresponding array of elbow joints mounted between said boom segments, and wherein said at least one position sensor comprises an array of rotational sensors mounted correspondingly to said array of elbow joints, said rotational sensors for sensing relative positions of said boom segments.

28. The device of claim 20 further comprising means for stabilizing said second end of said boom so as to maintain a substantially constant position of said utility head relative to an underwater object independent of movement of said floating vessel.

29. The device of claim 28 wherein said means for stabilizing said second end of said boom is a hydraulic float circuit cooperating with a primary hydraulic circuit, said primary hydraulic circuit for actuating said first actuators.

30. The device of claim 20 wherein said at least one sensor comprises an imaging sensor to provide environmental information to said operator from an underwater environment in proximity to said utility head.

31. The device of claim 30 wherein said imaging sensor is a visual imaging camera and said device further comprises a means for clearing a field of view of said camera.

32. The device of claim 31 wherein said means for clearing a field of view of said camera comprises means for injecting clear water into said field of view of said camera.

33. The device of claim 32 wherein said means for injecting clear water into said field of view of said camera comprises at least one water nozzle mounted adjacent said second end of said boom, a pressurized water supply coupled to said at least one water nozzle.

34. The device of claim 33 wherein said means for injecting clear water into said field of view of said camera further comprises a water manifold mounted to said boom adjacent said second end, said at least one water nozzle mounted to, so as to cooperate with, said water manifold, said water supply coupled to, so as to cooperate with, said water manifold.

35. The device of claim 34 wherein said water manifold is a rigid container pivotally mounted to said boom, a third actuator mounted between said rigid container and said boom for selective pivoting of said at least one water nozzle so as to direct a stream of water from said at least one nozzle into said field of view.

36. The device of claim 20 wherein said utility head comprises selectively operable claws.

37. The device of claim 20 wherein said utility head comprises a selectively operable clam shell rake.

38. The device of claim 20 wherein said utility head comprises a selectively operable overpack.

39. The device of claim 20 wherein said utility head comprises a selectively operable suction dredge.

40. The device of claim 20 wherein said utility head comprises a selectively articulatable viewing arm.

41. The device of claim 20 wherein said utility head comprises a selectively operable core sampling head.

42. The device of claim 20 wherein said utility head comprises an extraction head.

43. The device of claim 20 wherein said utility head comprises a selectively operable vibrator head.

44. The device of claim 20 wherein said utility head comprises a selectively operable grout application head.

45. The device of claim 20 wherein said utility head comprises a selectively operable surface cleaning head.

46. The device of claim 20 wherein said relaying of said sensed information to said remote operator is in real time.

47. The device of claim 1 wherein said boom is maintained in a neutral buoyancy state by hollow air filled tanks mounted near said second end of said boom.

48. The device of claim 20 wherein said boom is maintained in a neutral buoyancy state by hollow air filled tanks mounted near said second end of said boom.

* * * * *